United States Patent
Fu et al.

(10) Patent No.: US 10,079,902 B2
(45) Date of Patent: Sep. 18, 2018

(54) INFORMATION PUSH MANAGEMENT METHOD AND DEVICE (71) Applicant: ZTE CORPORATION, Shenzhen, Guangdong Province (CN)

(72) Inventors: Linjuan Fu, Shenzhen (CN); Xi Chen, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 15/310,540

(22) PCT Filed: Sep. 12, 2014

(86) PCT No.: PCT/CN2014/086439
§ 371 (c)(1),
(2) Date: Nov. 11, 2016

(87) PCT Pub. No.: WO2015/172474
PCT Pub. Date: Nov. 19, 2015

(65) Prior Publication Data
US 2017/0078427 A1 Mar. 16, 2017

(30) Foreign Application Priority Data
May 14, 2014 (CN) .......................... 2014 1 0201678

(51) Int. Cl.
H04W 24/00 (2009.01)
H04L 29/08 (2006.01)
(Continued)

(52) U.S. Cl.
CPC ......... H04L 67/26 (2013.01); G06Q 30/0261 (2013.01); G06Q 30/0267 (2013.01);
(Continued)

(58) Field of Classification Search
CPC ..... H04L 67/26; H04L 51/10; G06Q 30/0261; G06Q 30/0267; H04W 4/12; H04W 4/20; H04W 84/12
(Continued)

(56) References Cited

U.S. PATENT DOCUMENTS 7,466,986 B2 * 12/2008 Halcrow ............... H04W 48/16
455/456.1
8,837,698 B2 * 9/2014 Altberg ................. G06Q 30/02
379/114.13
(Continued)

FOREIGN PATENT DOCUMENTS

CN 101778496 A 7/2010
CN 102222078 A 10/2011
(Continued)

Primary Examiner — Marceau Milord
(74) Attorney, Agent, or Firm — Ling Wu; Stephen Yang; Ling and Yang Intellectual Property (57) ABSTRACT The embodiments of the present document provide an information push management method and device, herein the method includes: a communication terminal configures an advertisement information display switch of at least one WIFI hotspot in a WIFI hotspot list according to a control instruction; after receiving the information pushed by the WIFI hotspot, the communication terminal determines whether the advertisement information display switch of the WIFI hotspot pushing the information is ON when determining the information is advertisement information; if yes, the information is processed normally.

14 Claims, 3 Drawing Sheets (51) Int. Cl.
*H04W 4/12* (2009.01)
*H04W 4/20* (2018.01)
*G06Q 30/02* (2012.01)
*H04L 12/58* (2006.01)
*H04W 84/12* (2009.01)

(52) U.S. Cl.
CPC ............... H04L 51/10 (2013.01); H04W 4/12 (2013.01); H04W 4/20 (2013.01); H04W 84/12 (2013.01)

(58) Field of Classification Search
USPC .................................. 455/456.3, 456.2, 509
See application file for complete search history.

(56) References Cited

U.S. PATENT DOCUMENTS

| | | | | |
|---|---|---|---|---|
| 9,094,486 | B2* | 7/2015 | Altberg | H04M 7/006 |
| 9,118,778 | B2* | 8/2015 | Altberg | G06Q 30/02 |
| 9,247,489 | B2* | 1/2016 | Xiang | H04W 48/14 |
| 9,392,408 | B2* | 7/2016 | Johnson | H04W 4/02 |
| 9,419,733 | B2* | 8/2016 | Marathe | H04H 20/59 |
| 9,432,363 | B2* | 8/2016 | Abdulrahiman | H04L 63/0853 |
| 9,648,550 | B2* | 5/2017 | Zhao | H04W 48/16 |
| 2012/0036271 | A1* | 2/2012 | Patil | H04L 63/0272 |
| | | | | 709/227 |
| 2012/0197727 | A1* | 8/2012 | Kim | G06Q 30/02 |
| | | | | 705/14.64 |
| 2012/0253939 | A1* | 10/2012 | Grigoriev | G06Q 30/0251 |
| | | | | 705/14.61 |
| 2013/0173765 | A1* | 7/2013 | Korbecki | H04N 21/42209 |
| | | | | 709/221 |
| 2014/0022920 | A1* | 1/2014 | Dua | H04W 4/021 |
| | | | | 370/252 |
| 2014/0100962 | A1* | 4/2014 | Rajagopalan | G06Q 30/02 |
| | | | | 705/14.64 |
| 2014/0222551 | A1* | 8/2014 | Jain | G06Q 30/0243 |
| | | | | 705/14.42 |
| 2014/0236728 | A1* | 8/2014 | Wright | G06Q 30/0272 |
| | | | | 705/14.58 |
| 2014/0373123 | A1* | 12/2014 | Kang | H04L 41/22 |
| | | | | 726/7 |
| 2015/0302458 | A1* | 10/2015 | Dides | G06Q 30/0241 |
| | | | | 705/14.41 |
| 2016/0210602 | A1* | 7/2016 | Siddique | G06Q 20/0453 |
| 2017/0374611 | A1* | 12/2017 | Pragada | H04L 69/24 |

FOREIGN PATENT DOCUMENTS

| | | |
|---|---|---|
| CN | 102480674 A | 5/2012 |
| CN | 103246511 A | 8/2013 |
| CN | 103561152 A | 2/2014 |
| KR | 20090122573 A | 12/2009 |

* cited by examiner

INFORMATION PUSH MANAGEMENT METHOD AND DEVICE

TECHNICAL FIELD

The present document relates to the mobile communication field, and in particular to an information push management method and device.

BACKGROUND OF THE RELATED ART

Currently, with the extensive application of Wireless Local Area Networks WLAN technology, almost all of mobile terminals will use a WLAN module as a basic configuration, and a WLAN signal has advantages such as relatively wide propagation range and low cost. Therefore, location-based advertising services implemented by using the WLAN technology have been widely studied in many fields. For example, the advertisement information publishment carried out by a wireless fidelity WiFi technology is studied and described in patents such as "Advertisement Information Distribution System for the Mobile WiFi" and "Outdoor Advertisement System of WIFI Hotspot Type", etc.

Both the above information publishment and push technologies based on a Wifi are required to establish a data connection between a terminal device and a Wifi access point for publishing information, then the terminal device receives the information published and pushed by the Wifi access point, which limits the Wifi hotspot in the process of information push to some extent. Based on the above problem, now there is a new technology that is an information push based on a non-connection mode, i.e., the information push can be achieved without establishing the connection between the terminal device and the Wifi hotspot for publishing information, which in some aspects greatly facilitates the push of advertisements carried out by the Wifi hotspot. However, the way that information push can be achieved without establishing the connection brings a very bad experience effect to users of the terminal device. That is, the users will passively receive lots of advertisement information pushed by the Wifi hotspot without knowing it. Therefore, based on the above technology and the existing problem thereof, how to make a user actively select information sent by an access point that the user needs to receive in order to improve user satisfaction is a technical problem that needs to be solved urgently.

SUMMARY

The embodiments of the present document provide an information push management method and device, which can solve the problem that a user passively receives a large amount of advertisement information without knowing it.

The embodiment of the present application proposes an information push management method. The method includes:

a communication terminal configuring an advertisement information display switch corresponding to at least one WIFI hotspot in a WIFI hotspot list and the communication terminal according to a control instruction;

the communication terminal receiving information pushed by the WIFI hotspot;

the communication terminal determining whether the advertisement information display switch of the WIFI hotspot pushing the information is ON when determining the information is advertisement information; if yes, processing normally the information.

In one embodiment of the present document, said configuring an advertisement information display switch according to a control instruction includes:

before receiving the information pushed by the WIFI hotspot, the communication terminal directly receiving the control instruction sent by a user, and configuring the advertisement information display switch corresponding to the WIFI hotspot according to the control instruction; or the communication terminal displaying the information first pushed by the WIFI hotspot to a user and receiving the control instruction fed back by the user, and configuring the advertisement information display switch corresponding to the WIFI hotspot according to the control instruction.

In one embodiment of the present document, the communication terminal displaying the information first pushed by the WIFI hotspot to a user includes: the communication terminal acquiring summary information about the information, and displaying the acquired summary information to the user.

In one embodiment of the present document, the communication terminal determining the information is advertisement information includes: determining whether the information is multimedia information.

In one embodiment of the present document, determining whether the information is the multimedia information includes: the communication terminal determining whether the information is the multimedia information according to a Multipurpose Internet Mail Extensions type in the information.

In one embodiment of the present document, when a processing module determines the information is the advertisement information, the method further includes: when determining the advertisement information display switch of the WIFI hotspot pushing the information is OFF, directly discarding the information or not displaying the information; or displaying the information to a user and prompting the user whether the information is processed normally.

In one embodiment of the present document, the communication terminal configures the advertisement information display switch of the WIFI hotspot when the connection with the WIFI hotspot is not established.

In order to solve the above problems, an embodiment of the present application further proposes an information push management device, including a configuring module, a receiving module and a processing module;

the configuring module is configured to configure an advertisement information display switch of at least one WIFI hotspot in a WIFI hotspot list according to a control instruction;

the receiving module is configured to receive information pushed by the WIFI hotspot;

the processing module is configured to, when determining the information is advertisement information, determine whether the advertisement information display switch of the WIFI hotspot pushing the information is ON; if yes, process normally the information.

In one embodiment of the present document, the receiving module is further configured to directly receive the control instruction sent by a user before receiving the information pushed by the WIFI hotspot; and the configuring module is configured to configure the advertisement information display switch corresponding to the WIFI hotspot according to the control instruction; or the processing module is further configured to display the information first pushed by the WIFI hotspot to a user, the receiving module is further configured to receive the control instruction fed back by the user, and the configuring module is configured to configure the advertisement information display switch corresponding to the WIFI hotspot according to the control instruction.

In one embodiment of the present document, the configuring module includes a display unit; the display unit is configured to, after the communication terminal acquires summary information about the information, display the acquired summary information to the user.

In one embodiment of the present document, the processing module includes a determining unit; the determining unit is configured to determine whether the information is multimedia information.

In one embodiment of the present document, the determining unit determines whether the information is the multimedia information by determining a Multipurpose Internet Mail Extensions type in the information.

In one embodiment of the present document, the processing module is further configured to, when determining the information is the advertisement information and the advertisement information display switch of the WIFI hotspot pushing the information is OFF, directly discard the information or not display the information; or display the information to a user and prompt the user whether the information is processed normally.

In one embodiment of the present document, the configuring module is configured to configure the advertisement information display switch of the WIFI hotspot when the connection between the communication terminal and the WIFI hotspot is not established. The embodiments of the present application configure an advertisement information display switch of a WIFI hotspot. By configuring the advertisement information display switch, a user can actively select whether to turn on the advertisement information display switch to receive the advertisement information, which avoids the problem that the user passively receives a large amount of advertisement information without knowing it.

PREFERRED EMBODIMENTS

In an embodiment of the present document, a communication terminal configures an advertisement information switch corresponding to a WIFI hotspot according to a control instruction; after receiving advertisement information pushed by the WIFI hotspot, the communication terminal determines whether the advertisement information display switch of the WIFI hotspot pushing the information has been turned on, if yes, the information is processed normally; if no, the information is directly discarded or the summary content of the information is displayed to a user, and the user determines whether to reopen the advertisement information display switch according to the display content.

In the present embodiment, the way of configuring the advertisement information display switch according to the control instruction further includes: the communication terminal displays the information first pushed by the WIFI hotspot to a user, and receives a control instruction fed back by the user, and the communication terminal configures the advertisement information display switch corresponding to the WIFI hotspot and the communication terminal according to the control instruction. By configuring an advertisement display switch, the embodiments of the present application can make a user actively select whether to receive advertisement information pushed by the WIFI hotspot, which avoids that the user passively receives a large amount of useless advertisement information since the user cannot actively control the information pushed by the WIFI hotspot, which reduces user satisfaction. Hence, by using the information push management method in the embodiments of the present application, the problem that the user passively receives a large amount of advertisement information without knowing it can be solved.

The embodiments of the present document will be illustrated in detail below in conjunction with the accompanying drawings, and the embodiments of the present application and the features in these embodiments can be in any combination with each other without conflicts.

The First Embodiment

Figure 1:
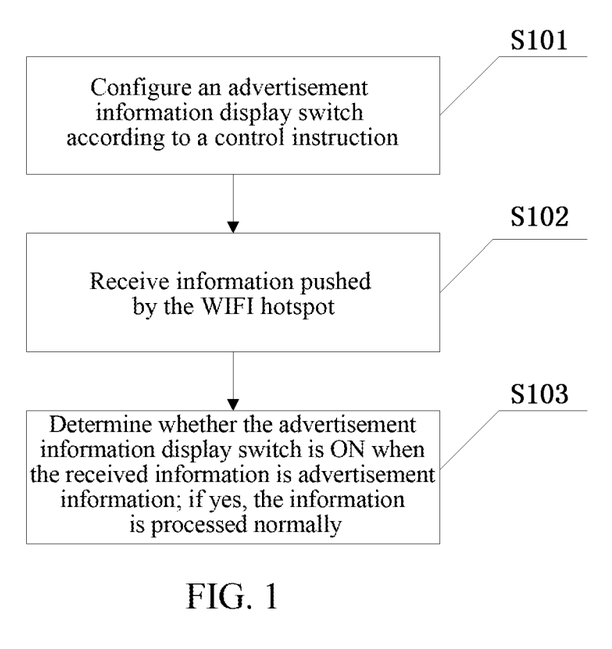
FIG. 1 is a flow chart of an information push management method provided by a first embodiment of the present document.

FIG. 1 is a flow chart of an information push management method provided in the present embodiment. The information push management method includes:

In step 101, an advertisement information display switch is configured according to a control instruction.

In step 102, the information pushed by a WIFI hotspot is received.

In step 103, it is determined whether the advertisement information display switch is ON when the received information is advertisement information; if yes, the information is processed normally.

In the present embodiment, the main body performing the above steps includes a communication terminal. The communication terminal configures the advertisement information display switch corresponding to the WIFI hotspot and the communication terminal according to a control instruction. The advertisement information display switch is in the communication terminal side.

In step 101, the communication terminal configures the advertisement information display switch corresponding to at least one WIFI hotspot in a WIFI hotspot list and the communication terminal according to the control instruction sent by a user. In the present embodiment, after receiving the control instruction sent by the user, the communication terminal alternatively searches for all the WIFI hotspots as far as possible within the range in which the communication terminal is located, and it may be preferred but not limited to generate a WIFI hotspot list in the communication terminal. The communication terminal selects at least one WIFI hotspot in the generated WIFI hotspot list to configure the advertisement information display switch, according to the control instruction sent by the user.

Alternatively, in the present embodiment, the way that the communication terminal configures an advertisement information display switch corresponding to at least one WIFI hotspot in a WIFI hotspot list and the communication terminal according to a control instruction of the user includes at least one of the following two ways:

First way: the communication terminal receives a control instruction sent by a user and configures an advertisement information display switch corresponding to at least one WIFI hotspot and the communication terminal before receiving the information pushed by the WIFI hotspot.

Second way: the communication terminal displays the information first pushed by the WIFI hotspot to a user and receives a control instruction fed back by the user, and the communication terminal configures the advertisement information display switch corresponding to the WIFI hotspot and the communication terminal according to the control instruction.

The above configurations of the advertisement information display switch can make a user actively control whether he/she needs to receive the advertisement information pushed by a certain WIFI hotspot.

In the present embodiment, the advertisement information display switch is configured preferably in the second way.

Alternatively, when the advertisement information display switch is configured in the second way, a user is required to send a control instruction according to the information first pushed by the WIFI hotspot, and the communication terminal configures the advertisement information display switch corresponding to the WIFI hotspot and the communication terminal according to the control instruction. In the present embodiment, in order to control the advertisement information pushed by the WIFI hotspot accurately, alternatively, the control instruction sent by the user is not limited to the information first pushed by the WIFI hotspot which is received by the communication terminal, but also includes the control instruction which is used for the configuration of the advertisement information display switch will be sent when the information pushed by the WIFI hotspot is received each time.

Alternatively, the process that the user sent the control instruction according to the information first pushed by the WIFI hotspot includes: after the communication terminal receives the information first pushed by the WIFI hotspot, the received information is parsed to parse out the summary content of the information, and the parsed summary content is displayed to the user at the same time. In the present embodiment, alternatively, the summary content is displayed under the corresponding WIFI hotspot list in the user communication terminal, which is convenient for the user to determine whether to send the control instruction to configure the advertisement information display switch of the WIFI hotspot. Certainly, it is not limited to display the summary content under the corresponding WIFI hotspot list, but the corresponding WIFI hotspot thereof may be embodied in the summary content, for example, the name or the physical address of the WIFI hotspot and etc., may be contained in the summary content.

In the step 102, the information pushed by the WIFI hotspot which is received by the communication terminal may be the information actively pushed by the WIFI hotspot, and may also be the information pushed by the WIFI hotspot which is searched for by the communication terminal.

In the present embodiment, the way that the communication terminal receives the information pushed by the WIFI hotspot includes at least way A or way B:

Way A: after a data connection between the communication terminal and the WIFI hotspot is established, the communication terminal receives the information pushed by the WIFI hotspot.

Way B: the communication terminal receives the information pushed by the WIFI hotspot when a data connection between the communication terminal and the WIFI hotspot is not established.

In the present embodiment, since the range within which the WIFI hotspot transmits information has a certain limitation, no matter in the above way A or way B, all the push information received by the communication terminal comes from WIFI hotspots within the coverage of the WLAN network in which the communication terminal is located.

In the present embodiment, the information pushed by the WIFI hotspot is preferably received in the way B. The way B is a new existing technology. The way B is a push technology for the WIFI hotspot information, which is performed without establishing the connection between the communication terminal and the WIFI hotspot. This way is that: on the premise of following the 802.11 WLAN specification, the WIFI hotspot realizes that a large amount of advertisement information about texts and multimedia data, etc is published and received through the Beacon frame, by a combination of an Advertisement Protocol cell and a Vendor Specific cell of a Beacon frame and the definition of the corresponding data format. The information sent by the WLAN hotspot fills the Advertisement Protocol cell and the Vendor Specific cell of the Beacon frame according to the following protocol format.

The value of an Advertisement Protocol ID sub-cell data of an Advertisement Protocol cell of an AP Beacon frame is defined using 221 (i.e., a custom data format), as shown in Table1 below:

TABLE 1

Advertisement Protocol ID Definition

| | | Description |
|---|---|---|
| Sub-cell | Advertisement Protocol ID | IEEE 802.11-2012 FIG. 8-354, Advertisement Protocol Tuplefield format |
| Value | 221(Vendor Specific) | Custom data format |

The data format of a Vendor Specific Content sub-cell of the Advertisement Protocol cell is defined as follows, as shown in Table2:

TABLE 2

Vendor Specific Content Sub-cell Data Format Definition

| Field Name | Message Group Id | Message Id | MIME Type | Length | Sequence Number | Continuation Flag | Data |
|---|---|---|---|---|---|---|---|
| Description | A group identity to | Message identity, | Message MIME type, | The total | If the message consists of | Whether the sub-message | Data |

TABLE 2-continued

Vendor Specific Content Sub-cell Data Format Definition

| Field Name | Message Group Id | Message Id | MIME Type | Length | Sequence Number | Continuation Flag | Data |
|---|---|---|---|---|---|---|---|
| | which the message belongs, for example, different combinations of pictures and texts may be put into different message groups | which is the identity of the message in the message group | for example, text, picture, voice, video multimedia information, etc. | length of the message | multiple sub-messages, "Sequence Number" represents the sequence number of the sub-message | is the final part of the message. '0' represents the sub-message is the final part; '1' represents there is still a following sub-message | |

Figure 2:
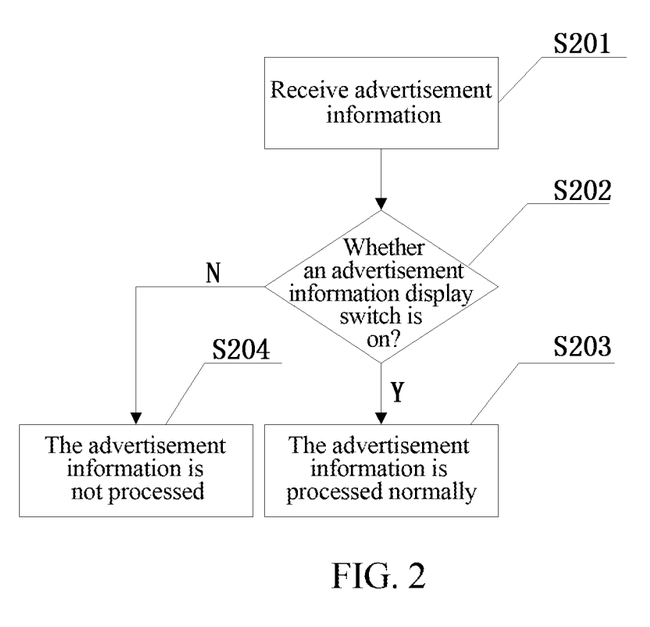
FIG. 2 is a processing method when the information pushed is advertisement information, which is provided by the first embodiment of the present document.

In the above step 103, when the information received by a mobile terminal is advertisement information, a processing method provided with reference to FIG. 2 when the push information is the advertisement information includes:

In step 201, advertisement information is received.

In step 202, it is determined whether an advertisement information display switch is ON state; if yes, the processing proceeds to step 203; if no, the processing proceeds to step 204.

In step 203, the advertisement information is processed normally.

In step 204, the advertisement information is not processed.

In the present embodiment, in step 202, it is determined whether the advertisement information display switch corresponding to the advertisement information is ON state based on the advertisement information display switch that is previously set, if yes, it indicates that the user allows the communication terminal to process the information pushed by the WIFI hotspot corresponding to the advertisement information, thus the processing proceeds to step 203. In step 203, processing the advertisement information normally includes: the advertisement information is parsed and the parsed advertisement information is displayed to a user by the communication terminal, so that the user can view the content of the advertisement information normally.

In the present embodiment, the way of displaying the parsed advertisement information to a user includes:

Way A1: the content of the advertisement information is directly displayed to the user. Or Way A2: the user is prompted whether to view the advertisement information.

Certainly, without loss of generality, the ways for the advertisement information display are not limited to the above ways, and the advertisement information may also be displayed to the user in other ways.

If no, it indicates that the user does not allow the communication terminal to process the information pushed by the WIFI hotspot corresponding to the advertisement information, thus the processing proceeds to step 204. In step 204, the way that the advertisement information is not processed normally includes:

Way B1: the advertisement information is directly discarded or is not displayed. Or Way B2: the information is displayed to a user and the user is prompted whether to process the information normally.

In way B2, displaying the information to a user and prompting the user whether to process the information normally specifically include:

summary content of the information is displayed to a user, and the user determines whether to reopen the advertisement information display switch according to the displayed summary content.

Certainly, without loss of generality, the above processing ways are not limited to the above ways, and the processing may also be processed in other ways.

Alternatively, in the present embodiment, the determining process that the communication terminal determines whether the received information is the advertisement information includes: it is determined whether the received information is multimedia information, herein the multimedia information includes at least the text-type information, the audio-type information, video-type information or picture-type information, and the multimedia information may also be a combination of the above multiple information, for example, the text-type information and picture-type information may also be a combination of the text-type information, the video-type information and the picture-type information, etc.

Alternatively, in the present embodiment, alternatively a custom advertisement information format is set. The received information is compared with the custom advertisement information format, if the comparison result matches, then it indicates that the information is advertisement information. In the present embodiment, the custom advertisement information format which is alternatively set includes: a group identity to which the message belongs, which represents that different combinations of pictures and texts may be put into different message groups; a message identity, which represents an identity with an identification function; a message Multipurpose Internet Mail Extensions MIME type, such as texts, pictures, voices, videos, etc.; the total length of the message; the sequence number of the message, for example, when the message consists of multiple sub-messages, the sequence number is used for numbering the multiple sub-messages; a Continuation Flag, which represents that whether the sub-message is the final part of the message, for example, '0' represents that the sub-message is the final part; '1' represents that there is still a following sub-message; and data, etc.

In the present embodiment, alternatively, it is determined whether the received information is the advertisement information by the message MIME type. Certainly, determining the advertisement information by the message MIME type is an alternative method in the present embodiment. The determination for the advertisement information may also be performed by other custom format information, for example, the total length of the message or the group identity to which the message belongs, etc may be used.

Alternatively, in the present embodiment, the communication terminal configuring the advertisement information display switch corresponding to the WIFI hotspot and the communication terminal according to a control instruction may be an operation step which is performed when the communication connection between the communication terminal and the WIFI is not established, and may also be an operation which is performed after establishing the communication connection between the communication terminal and the WIFI. In the present embodiment, alternatively, it is an operation which is performed when the connection between the communication terminal and the WIFI hotspot is not established.

In step 102, in the present application, the communication terminal preferably uses the way B, i.e., when the communication between the communication terminal and the WIFI hotspot is not established, to receive the information pushed by the WIFI hotspot. In the present embodiment, when using the way A, i.e., when the information pushed by the WIFI hotspot is received after the communication connection between the communication terminal and the WIFI, the configuration method of the advertisement information display switch is the same as the configuration method using mode B.

The Second Embodiment

Figure 3:
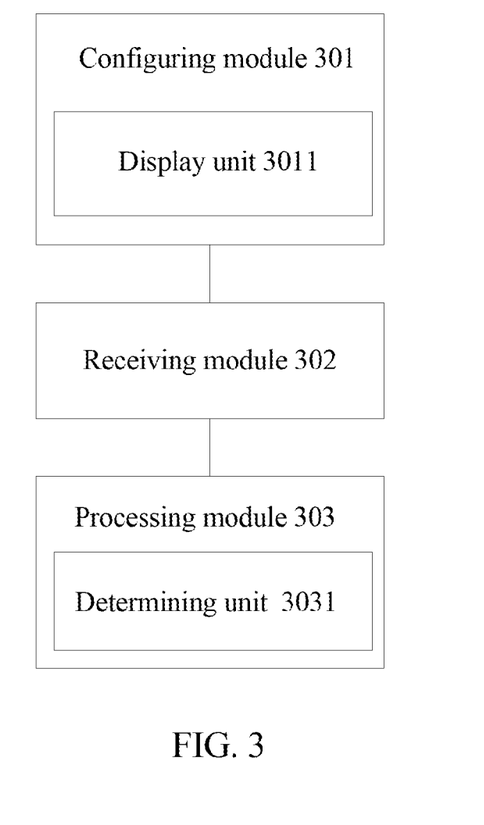
FIG. 3 is a flow chart of an information push management device provided by a second embodiment of the present document.

FIG. 3 is an information push management device provided in the present embodiment. The device includes a configuring module 301, a receiving module 302 and a processing module 303.

The configuring module 301 is configured to configure an advertisement information display switch of at least one WIFI hotspot in a WIFI hotspot list by a communication terminal according to a control instruction.

The receiving module 302 is configured to receive information pushed by the WIFI hotspot by the communication terminal.

The processing module 303 is configured to determine whether the advertisement information display switch of the WIFI hotspot pushing the information is ON when the communication terminal determines the information is advertisement information; if yes, process normally the information.

In the present embodiment, the configuring module 301 configures the advertisement information display switch corresponding to at least one WIFI hotspot in a WIFI hotspot list and the communication terminal according to a control instruction sent by a user. The advertisement information display switch is in the communication terminal side. In the present embodiment, after receiving the control instruction sent by the user, the communication terminal alternatively searches for all the WIFI hotspots as far as possible within the range in which the communication terminal is located. It may be preferred but not limited to generate a WIFI hotspot list in the communication terminal; the communication terminal selects at least one WIFI hotspot in the generated WIFI hotspot list to configure the advertisement information display switch, according to the control instruction sent by the user.

Alternatively, in the present embodiment, the way that the configuring module 301 configures an advertisement information display switch corresponding to at least one WIFI hotspot in a WIFI hotspot list and the communication terminal according to a control instruction includes at least one of the following two ways:

Way A: before receiving the information pushed by the WIFI hotspot, the receiving module of the communication terminal receives a control instruction sent by a user, and the configuring module 301 configures an advertisement information display switch corresponding to the WIFI hotspot and the communication terminal according to the control instruction.

Way B: the processing module of the communication terminal displays the information first pushed by the WIFI hotspot to a user and receives a control instruction fed back by the user, and the configuring module 301 configures the advertisement information display switch corresponding to the WIFI hotspot and the communication terminal according to the control instruction.

The above configurations of the advertisement information display switch can make a user actively control whether the user needs to receive the advertisement information pushed by a WIFI hotspot.

In the present embodiment, the advertisement information display switch is configured preferably in the way B.

Alternatively, when the advertisement information display switch is configured in the way B, a user is required to send a control instruction according to the information first pushed by the WIFI hotspot. The configuring module 301 configures the advertisement information display switch corresponding to the WIFI hotspot and the communication terminal according to the control instruction. In the present embodiment, in order to control the advertisement information pushed by the WIFI hotspot accurately, alternatively, the control instruction sent by the user is not limited to the information first pushed by the WIFI hotspot, which is received by the communication terminal, but also includes the control instruction which is used for the configuration of the advertisement information display switch will be sent when the information pushed by the WIFI hotspot is received each time.

Alternatively, the configuring module 301 further includes a display unit 3011. The display unit 3011 is configured to parse received information to parse out the summary content of the information after the communication terminal receives the information first pushed by the WIFI hotspot, and display the parsed summary content to the user at the same time. In the present embodiment, alternatively, the summary content is displayed under the corresponding WIFI hotspot list at the user communication terminal, which is convenient for the user to determine whether to send the control instruction to configure the advertisement information display switch of the WIFI hotspot. Certainly, it is not limited to display the summary content under the corresponding WIFI hotspot list, but the corresponding WIFI hotspot thereof may be embodied in the summary content, for example, the name or the physical address of the WIFI hotspot and etc., may be contained in the summary content.

In the present embodiment, the receiving module 302 receives the information pushed by the WIFI hotspot, herein, the information pushed by the WIFI hotspot which is received by the receiving module 302 may be the information actively pushed by the WIFI hotspot, and may also be the information pushed by the WIFI hotspot which is searched for by the communication terminal.

In the present embodiment, the way that the receiving module 302 receives the information pushed by the WIFI hotspot includes at least a way A11 or a way B11:

Way A11: after a data connection between the communication terminal and the WIFI hotspot is established, the communication terminal receives the information pushed by the WIFI hotspot.

Way B11: the communication terminal receives the information pushed by the WIFI hotspot when a data connection between the communication terminal and the WIFI hotspot is not established.

In the present embodiment, since the range within which the WIFI hotspot transmits information has a certain limitation, no matter in the above way A11 or the way B11, all the push information received by the communication terminal comes from WIFI hotspots within the coverage of the WLAN network in which the communication terminal is located.

In the present embodiment, the information pushed by the WIFI hotspot is preferably received in the way B11. The way B11 is a new existing technology. The way B11 is a push technology for the WIFI hotspot information, which is performed without establishing the connection between the communication terminal and the WIFI hotspot. The principle for achieving the above way B11 is that: on the premise of following the 802.11 WLAN specification, the WIFI hotspot realizes that a large amount of advertisement information about texts and multimedia data and so on is published and received through the Beacon frame, by a combination of an Advertisement Protocol cell and a Vendor Specific cell of a Beacon frame and the definition of the corresponding data format.

The value of an Advertisement Protocol ID sub-cell data of an Advertisement Protocol cell of an AP Beacon frame is defined using 221 (i.e., a custom data format), as shown in Table1 below:

TABLE 1

Advertisement Protocol ID Definition

| | | Description |
|---|---|---|
| Sub-cell | Advertisement Protocol ID | IEEE 802.11-2012 FIG. 8-354, Advertisement Protocol Tuplefield format |
| Value | 221(Vendor Specific) | Custom data format |

The data format of the Vendor Specific Content sub-cell of the Advertisement Protocol cell is defined as follows, as shown in Table2.

In the present embodiment, the processing module 303 is configured to determine whether the advertisement information display switch of the WIFI hotspot pushing the information is ON when determining the received information is the advertisement information. If yes, it indicates that the user allows the communication terminal to process the information pushed by the WIFI hotspot corresponding to the advertisement information, thus the advertisement information is processed normally. In the present embodiment, the normal processing includes: the advertisement information is parsed and the parsed advertisement information is displayed to a user by the communication terminal, so that the user can view the content of the advertisement information normally.

In the present embodiment, the way that the processing module 303 displays the parsed advertisement information to a user includes:

Way A12: the content of the advertisement information is directly displayed to the user. Or Way A22: the user is prompted whether to view the advertisement information.

Certainly, without loss of generality, the ways for the advertisement information display are not limited to the above ways, and the advertisement information may also be displayed to the user in other ways.

If no, it indicates that the user does not allow the communication terminal to process the information pushed by the WIFI hotspot corresponding to the advertisement information. In the present embodiment, the processing way when the advertisement information display switch is not turned on alternatively includes one of the following two ways:

Way B12: the advertisement information is directly discarded or is not displayed. Or Way B22: the information is displayed to a user and the user is prompted whether to process the information normally.

In way B22, displaying the information to a user and prompting the user whether to process the information normally specifically include:

the summary content of the information is displayed to a user, and the user determines whether to reopen the advertisement information display switch according to the displayed summary content.

Certainly, without loss of generality, the above processing ways are not limited to the above ways, and the processing may also be processed in other ways.

TABLE 2

Vendor Specific Content Sub-cell Data Format Definition

| Field Name | Message Group Id | Message Id | MIME Type | Length | Sequence Number | Continuation Flag | Data |
|---|---|---|---|---|---|---|---|
| Description | A group identity to which the message belongs, for example, different combinations of pictures and texts may be put into different message groups | Message identity, which is the identity of the message in the message group | Message MIME type, for example, text, picture, voice, video multimedia information, etc. | The total length of the message | If the message consists of multiple sub-messages, "Sequence Number" represents the sequence number of the sub-message | Whether the sub-message is the final part of the message. '0' represents the sub-message is the final part; '1' represents there is still a following sub-message | Data |

Alternatively, in the present embodiment, the processing module 303 includes a determining unit 3031. The determining unit 3031 determines whether the received information is the advertisement information. The determining process includes: it is determined whether the received information is multimedia information, herein, the multimedia information includes at least the text-type information, the audio-type information, video-type information or picture-type information, and it may also be a combination of the above multiple information, for example, the text-type information and picture-type information may also be a combination of the text-type information, the video-type information and the picture-type information, etc.

Alternatively, in the present embodiment, alternatively a custom advertisement information format is set. The received information is compared with the custom advertisement information format. If the comparison result matches, then it indicates that the information is advertisement information. In the present embodiment, the custom advertisement information format which is alternatively set includes: a group identity to which the message belongs, which represents that different combination of pictures and texts may be put into different message groups; a message identity, which represents an identity with an identification function; a message Multipurpose Internet Mail Extensions MIME type, such as texts, pictures, voices, videos, etc.; the total length of the message; the sequence number of the message, for example, when the message consists of multiple sub-messages, the sequence number is used for numbering the multiple sub-messages; a Continuation Flag, which represents that whether the sub-message is the final part of the message, for example, '0' indicates that the sub-message is the final part; '1' indicates that there is still a following sub-message; and data, etc.

In the present embodiment, alternatively, the determining unit 3031 determines whether the received information is the advertisement information by the message MIME type. Certainly, determining the advertisement information by the message MIME type is an alternative method in the present embodiment. The determination for the advertisement information may also be performed by other custom format information, for example, the total length of the message or the group identity that the message belongs to, etc may be used.

Alternatively, in the present embodiment, the configuration of the advertisement information display switch by the configuring module 301 according to a control instruction may be performed when the communication connection between the communication terminal and the WIFI is not established, and may also be performed after the communication connection between the communication terminal and the WIFI is established. In the present embodiment, the configuration is alternatively performed when the connection between the communication terminal and the WIFI hotspot is not established.

The Third Embodiment

Figure 4:
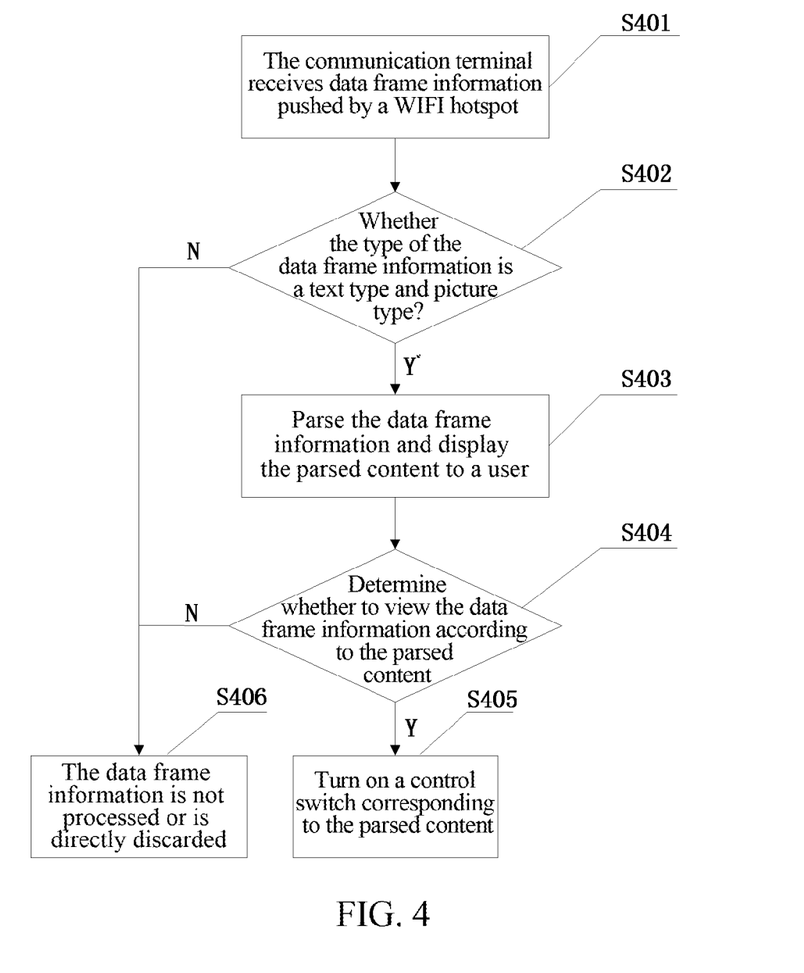
FIG. 4 is a processing method when the information pushed is text-type information and picture-type information, which is provided by a third embodiment of the present document.

FIG. 4 is a processing method when the information is text and picture information, which is provided in the present embodiment. The processing method includes:

In step 401, the communication terminal receives data frame information pushed by a WIFI hotspot.

In step 402, it is determined whether the type of the data frame information is text type and picture type, if yes, the processing proceeds to step 403; if no, the processing proceeds to step 406.

In step 403, the data frame information is parsed, and the parsed content is displayed to a user.

In step 404, the user determines whether he/she would like to view the data frame information according to the parsed content; if yes, the processing proceeds to step 405, if no, the processing proceeds to step 406.

In step 405, a control switch corresponding to the parsed content is turned on.

In step 406, the data frame information is not processed or directly discarded.

In the above step 401, the data frame information received by the communication terminal is the information that is first pushed to the communication terminal by the WIFI hotspot when the data connection between the communication terminal and the WIFI hotspot is not established; certainly, the information is not limited to the information first pushed by the WIFI hotspot.

In the above step 402 and step 403, the process of determining whether the type of the data frame information is text type and picture type includes: the data in the previously customized Advertisement Protocol cell and the Vendor Specific cell in the data frame information is parsed after the communication terminal receives the data frame information. It is determined whether the MIME type in the Vendor Specific Content sub-cell is text type and picture. If yes, the specific Data is parsed. Herein, the relevant protocols and header files of the data frame information are included in the Advertisement Protocol cell; the MIME type of the information, the total length of the message and other data, etc are included in the Vendor Specific cell.

In the above step 405, a control switch corresponding to the parsed content is turned on. Herein, the control switch may be a control switch that is configured between the communication terminal side and the WIFI hotspot according to a control instruction which is sent to the communication terminal before performing the step 401. The control switch may also be a control switch that is generated between the communication terminal side and the WIFI hotspot according to a control instruction which is sent by a user based on the parsed content.

In step 404, the user determines whether he/she would like to view the data frame information according to the parsed content. If the user would like to view the data frame information, the control switch in step 405 is directly turned on. The communication terminal displays all of the content of the data frame information to the user, so that the user can read or browse the content.

The above is a detailed description of the present document that is further made in combination with specific embodiments, and it cannot be considered that the specific embodiments of the present document are only limited to these descriptions. For those skilled in the technical art of the present document, on the premise of not departing from the concepts of the present document, simple deductions or replacements can also be made, and all of which should be regarded within the protection scope of the present document.

Those skilled in the art can understand that all or parts of steps of the above-mentioned embodiments can be implemented using computer program processes. The computer program can be stored in one computer readable storage medium. The computer program is executed on the corresponding hardware platform (e.g., system, equipment, apparatus, device, etc), and when the computer program is executed, one of steps of the method embodiments or the combination thereof is included.

Alternatively, all or parts of steps of the above-mentioned embodiments can also be implemented using integrated circuits, these steps can be fabricated into individual integrated circuit modules respectively, or multiple modules or steps in these steps are fabricated into a single integrated circuit to implement. Thus, the present document is not limited to any particular combination of hardware and software.

Devices/functional modules/functional units in the above-mentioned embodiments can be implemented using a general-purpose computing device, they can be centralized on a single computing device, or distributed on the network which consists of multiple computing devices.

Devices/functional modules/functional units in the above-mentioned embodiments are implemented in the form of software functional module, and when sold or used as a separate product, it can be stored in one computer readable storage medium. The above-mentioned computer readable storage medium can be read-only memory, disk or compact disc, etc.

INDUSTRIAL APPLICABILITY

The embodiments of the present application configure an advertisement information display switch of a WIFI hotspot by configuring the advertisement information display switch, so that a user can actively select whether to turn on the advertisement information display switch to receive the advertisement information, which avoids the problem that the user passively receives a large amount of advertisement information without knowing it.

What is claimed is:

1. An information push management method, comprising:
a communication terminal configuring an advertisement information display switch of at least one WIFI hotspot in a WIFI hotspot list according to a control instruction;
the communication terminal receiving information pushed by the WIFI hotspot;
the communication terminal determining whether the advertisement information display switch of the WIFI hotspot pushing the information is ON when determining the information is advertisement information; if yes, processing normally the information,
wherein, said configuring an advertisement information display switch according to a control instruction comprises:
before receiving the information pushed by the WIFI hotspot, the communication terminal directly receiving the control instruction sent by a user, and configuring the advertisement information display switch corresponding to the WIFI hotspot according to the control instruction; or
the communication terminal displaying the information first pushed by the WIFI hotspot to a user, and receiving the control instruction fed back by the user, and configuring the advertisement information display switch corresponding to the WIFI hotspot according to the control instruction,
wherein a user can actively select whether to turn on the advertisement information display switch to receive the advertisement information to avoid the problem that the user passively receives a large amount of advertisement information without knowing it.

2. The information push management method according to claim 1, wherein, the communication terminal displaying the information first pushed by the WIFI hotspot to a user comprises: the communication terminal acquiring summary information about the information, and displaying the acquired summary information to the user.

3. The information push management method according to claim 1, wherein, the communication terminal determining the information is advertisement information comprises: determining whether the information is multimedia information.

4. The information push management method according to claim 3, wherein, determining whether the information is multimedia information comprises: the communication terminal determining whether the information is the multimedia information according to a Multipurpose Internet Mail Extensions type in the information.

5. The information push management method according to claim 1, wherein, when the communication terminal determines the information is the advertisement information, the method further comprises: when determining the advertisement information display switch of the WIFI hotspot pushing the information is OFF,
directly discarding the information or not displaying the information; or
displaying the information to a user and prompting the user whether the information is processed normally.

6. The information push management method according to claim 1, wherein, the communication terminal configures the advertisement information display switch of the WIFI hotspot when the connection with the WIFI hotspot is not established.

7. A computer program comprising program instructions, when the program instructions are executed by a communication terminal, the communication terminal can implement the method of claim 1.

8. A carrier, carrying the computer program according to claim 7.

9. An information push management device, comprising a configuring module, a receiving module and a processing module;
the configuring module is configured to configure an advertisement information display switch of at least one WIFI hotspot in a wireless fidelity WIFI hotspot list according to a control instruction;
the receiving module is configured to receive information pushed by the WIFI hotspot;
the processing module is configured to, when determining the information is advertisement information, determine whether the advertisement information display switch of the WIFI hotspot pushing the information is ON; if yes, process normally the information,
wherein, the receiving module is further configured to directly receive the control instruction sent by a user before receiving the information pushed by the WIFI hotspot; and the configuring module is configured to configure the advertisement information display switch corresponding to the WIFI hotspot according to the control instruction; or
the processing module is further configured to display the information first pushed by the WIFI hotspot to a user, the receiving module is further configured to receive the control instruction fed back by the user, and the configuring module is configured to configure the advertisement information display switch corresponding to the WIFI hotspot according to the control instruction,
wherein a user can actively select whether to turn on the advertisement information display switch to receive the advertisement information to avoid the problem that the user passively receives a large amount of advertisement information without knowing it.

10. The information push management device according to claim 9, wherein, the configuring module comprises a display unit; the display unit is configured to, after the communication terminal acquires summary information about the information, display the acquired summary information to the user.

11. The information push management device according to claim 9, wherein, the processing module comprises a determining unit; the determining unit is configured to determine whether the information is multimedia information.

12. The information push management device according to claim 11, wherein the determining unit is configured to determine whether the information is the multimedia information by determining a Multipurpose Internet Mail Extensions type in the information.

13. The information push management device according to claim 9, wherein the processing module is further configured to, when determining the information is the advertisement information and the advertisement information display switch of the WIFI hotspot pushing the information is OFF, directly discard the information or not display the information;

display the information to a user and prompt the user whether the information is processed normally.

14. The information push management device according to claim 9, wherein the configuring module is configured to configure the advertisement information display switch of the WIFI hotspot when the connection between the communication terminal and the WIFI hotspot is not established.

* * * * *